United States Patent [19]

Raymond et al.

[11] Patent Number: 4,879,161

[45] Date of Patent: Nov. 7, 1989

[54] METHOD FOR PRINTING A DOUBLE-SIDED DISPLAY ON TRANSPARENT FILM

[76] Inventors: Geri L. Raymond; Mark A. Raymond, both of 3475 S. Quay St., Lakewood, Colo. 80227

[21] Appl. No.: 121,336

[22] Filed: Nov. 16, 1987

[51] Int. Cl.[4] .................................................. B32R 9/00

[52] U.S. Cl. .................................. 428/195; 428/542.2; 428/542.6; 40/626

[58] Field of Search .................. 428/542.6, 542.2, 195; 40/626

[56] References Cited

U.S. PATENT DOCUMENTS

| | | | |
|---|---|---|---|
| Re. 28,506 | 8/1975 | Quaintance et al. | 428/418 |
| 4,262,042 | 4/1981 | Bruskin | 428/542.2 |
| 4,371,598 | 2/1983 | Medernach et al. | 430/313 |
| 4,684,264 | 8/1987 | Paperno et al. | 428/542.2 |

*Primary Examiner*—Ellis P. Robinson
*Assistant Examiner*—P. J. Ryan
*Attorney, Agent, or Firm*—James E. Pittenger

[57] ABSTRACT

A process for printing a two-sided visual display for attachment to a window, screen or object is provided which can be identically viewed from either side of the support surface. The carrier sheet is of the electrostatic adhesion type which clings to the support surface without glue or other adhesives. The display is formed by being printed on one side of the flexible transparent carrier sheet with quick drying inks having the final desired color. The inks are applied directly to the carrier sheet without overlap or underlayment. Each color segment can be overprinted in order to emphasize and enhance the color of the individual sections. A cover sheet can be applied to the display to facilitate handling and storage. The final product when in place can be visibly observed from either side with equal clarity and appearance.

7 Claims, 1 Drawing Sheet

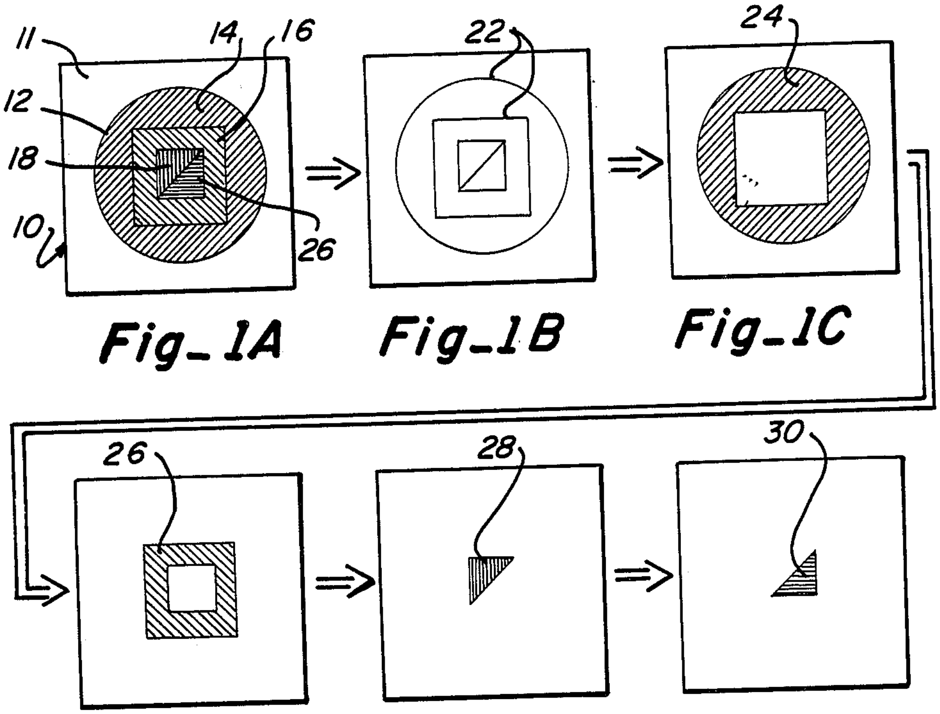
Fig_1A Fig_1B Fig_1C
Fig_1D Fig_1E Fig_1F
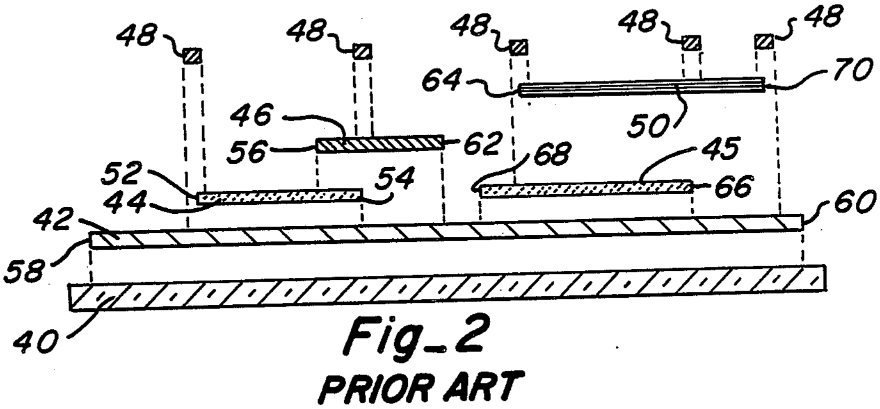
Fig_2
PRIOR ART
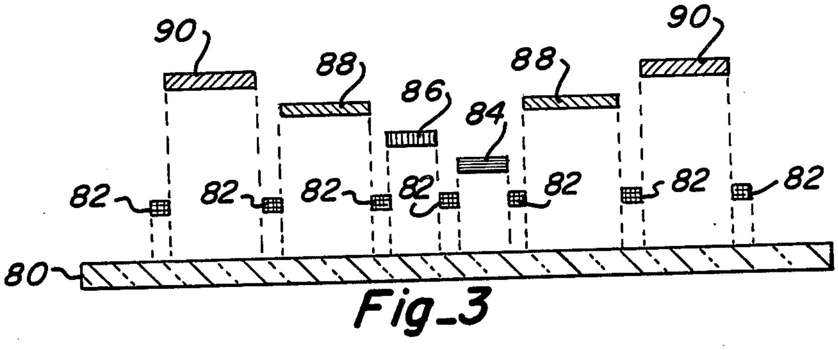
Fig_3

METHOD FOR PRINTING A DOUBLE-SIDED DISPLAY ON TRANSPARENT FILM

FIELD OF THE INVENTION:

This invention is directed to a method for printing a double-sided display on transparent film materials. It is more specifically directed to a method and product for precision multi-color printing on transparent film material whereby the image as viewed from either side of the material is identical.

BACKGROUND OF THE INVENTION:

When it comes to placing designs or advertising on windows such as those in stores, business establishments and homes, it has usually been required that the decoration must be drawn directly on the glass by an artist or person having considerable skill. Thus, during a holiday season or for a special occasion an advertising design display or greeting of this type is placed on a suitable window or other surface for viewing either from the outside or from the inside, but not both. Up until now, it has been impossible to have a suitable display that is viewable from both sides with the same quality and appearance.

Because of the fact that eventually the design will have to be removed, it was necessary to apply the design with water soluble paints or inks and to apply the design to the side of the window that was protected from the weather which usually meant the inside. Thus, the artist if he wanted to make a presentation which would be viewed from the outside, would have to reverse his image for the specific viewing and then overlay the entire design when completed with an opaque material to increase the visibility of the image.

Once the usefulness of the presentation or display has been completed, it is then necessary to remove the design by washing the window and removing the paint or inks that were used. As a result, the original artwork is lost forever with any new presentation having to be made again later as a new original design.

In fairly recent years, improvements in this method have been incorporated by using transparent plastic sheet material as a base substrate or carrier for applying the design. These types of materials have the capability of being charged by static electricity and substantially adhere to the surface of a clean window by the electrostatic charge. In this way, the design can be applied to the transparent sheet material and the material can be removed and discarded once the usefulness of the design has been completed.

It was found in preparing these types of displays that it was necessary to provide an opaque underlayment coating directly on the substrate to provide a backing for the multiple colors that are subsequently used to complete the design. Thus, the underlayment was a necessary step in order to provide a design or presentation which could be correctly seen when placed on the window. This is especially true, when sunlight shines on the window which in many cases washes out the colors of the design making the presentation difficult to see.

This same type of process has been used for a number of years in the manufacture of decalcomania. In a decalcomania process which is commonly called "decals", the decal has a design which is printed directly on a flexible transparent substrate or film material which is mounted by a suitable water activated adhesive to a backing sheet. The design itself is printed in the same manner as described above. Thus, an underlayment layer is provided to make the design and the colors of the design visible and legible. Because of this process, the design can only be adequately viewed from one side. Depending upon whether the decal or the display is to be placed on the inside or the outside of a window, the design must be arranged accordingly to accommodate the side from which the display will be viewed.

Because of these limitations, it has been known for many years that it would be of great advantage to be able to view a design display placed on a window, divider, or other mounting surface so that the display can be viewed with equal clarity from either side. Thus, one design will have the advantage of providing double function and thus, performing double duty. Accordingly, the applicants have developed a unique and novel process for printing a display or presentation so that is can be readily seen from either side so that it is immaterial as to which side the display is being viewed.

In addition, it is an advantage and feature of this invention that the display product can be easily removed from the window and stored for later reuse or moved to a different location as desired. Another feature of this invention is that the display can have the appearance of being hand drawn or painted on the window and yet, it can be easily removed and reused as desired. It has been found that a product of this type can have major advantages over the prior inferior products which have existed for many years.

INFORMATION DISCLOSURE STATEMENT:

The applicants are aware of their duty to disclose to the Patent Office all information which is believed to be material to the examination of this application. In accordance with this duty the applicants hereby state that they are unaware of any issued patents or prior art which are material or pertinent to the examination of this application.

SUMMARY OF THE INVENTION:

The present invention is directed to a process for printing or otherwise forming designs or displays on thin transparent sheet material.

In most cases, the transparent sheet material on which the design or display is imprinted will be thin, flexible plastic material having electrostatic adhering characteristics. This material is selected from a group including polyvinyl chloride and polyvinylacetate. This material is commonly used by the silkscreen and printing industries for window advertising, decorative trim, game products and product advertising. It requires no adhesive with the adhesion to the glass or plastic surface caused by a static electricity charge and a partial vacuum.

Difficulty in the past has been encountered when printing on this type of material in that the ink especially in a multi-color rotary type press is not absorbed by the substrate between color sections of the press.

In the present invention, the design or display is first prepared by being hand drawn or printed on a transparent sheet of flexible plastic material. Although it is not absolutely necessary to use the electrostatic vinyl material, the original can be prepared on this substrate.

In most cases, the original will be prepared as the full color display or presentation that is desired for the finished product. Once the original art work has been completed, the plastic film is placed on a computerized printing scanner which digitizes the display and places the data in storage in a computer memory.

It is critical to the present process that the original design be prepared so that absolutely no colors overlap in the design and in many cases the individual features of the design will be outlined in a dark color such as black. In this way, the outline itself separates the colors and features providing emphasis to the overall design. It should be understood, however, that it is not absolutely necessary to outline all of the features, but it helps to differentiate or emphasize the color separation.

The scanning process that is commonly used for most printing processes today utilizes a color separation filter for each of the primary colors such as blue, red, yellow and black. It is anticipated that most of the displays that are fabricated in this process will be of the four-color type. However, it is not necessary that the design be limited to these four colors, since any number of colors can be provided depending upon the actual color segments desired.

The digitized data for each color or shade of color is printed by a controlled light source on a light sensitized flexible printing plate or mat that can be mounted on a rotary or flat plate printing press for the printing process. A separate mat is produced for each color in the finished display. In most cases, it is preferred that the rotary printing press be used in order to increase the efficiency of the process as well as reduce the overall production time for the product.

For the printing process, flexible plastic sheet wound in a roll configuration is mounted on the press and the material is fed through the press with the application of each of the colors precisely located to form the overall finished display product. By precisely controlling the positioning of the various color segments, the finished product is provided so that all of the colors are applied directly to the surface of the plastic substrate without any overlap. In this way, the final design is identical when viewed from either side of the product which provides the unique effect which is obtained.

The ink which is utilized for this process must be of the extremely fast drying type and have considerably deeper color tones than is provided in usual printing inks. This has been found to be a requirement since there is no backing or underlayment color layer provided in the design which in the past has been used to emphasize or improve the appearance of the display. In addition, ultraviolet dryers are utilized at each stage of the printing process in order to dry the inks to prevent them from smearing or bleeding across the segment edges or the outlines provided in the display.

As a part of this process, it has been found that in some cases it is of advantage to run the same rolled material upon which the display has been printed through the press one or more additional times with each pass through the press reapplying the same color to the same segment area to make a more dense and enhanced visual display. Naturally, the control and operation of the press is extremely important so that the color layers precisely coincide with the previous application to make a sharp and distinct display. This color and enhancement procedure is feasible since there is no overlap of the colors or underlayment provided. Thus, the colors are pure and provide clarity to the design.

BRIEF DESCRIPTION OF THE DRAWINGS:

Other features of this invention will appear in the following description and appended claims, reference being made to the accompanying drawings forming a part of the specification wherein like reference characters designate corresponding parts in the similar views.

FIG. 1A through FIG. 1D show a pictorial sequence of the scanning of the original master display showing the color separation sequence that produces the printing plates for the process according to the present invention;

FIG. 2 is an enlarged exploded sectional view of a display illustrating the prior art printing process; and FIG. 3 is an enlarged exploded cross-sectional view of the display according to the printing process of the present invention.

DETAILED DESCRIPTION OF THE INVENTION

Turning now more specifically to the drawings, FIG. 1 which has six different parts (A–F) illustrates the procedure that is used for scanning the master display 10 in order to accomplish the printing process according to the present invention.

For the purpose of illustration throughout this application a reference will be made to the use of a thin, transparent sheet material substrate 11 such as polyvinylchloride or polyvinylacetate which meets the requirements of a so-called electrostatic adhering material. This is the type of material which can easily hold an electrostatic charge which will readily adhere the material to an object such as a window, wall, flexible curtain, appliance, etc. Thus, the sheet material 11 will take on an electrostatic charge which is opposite to the object to which it is to be adhered which allows the material to securely cling to the object without the benefit of any adhesive or fastener for as long as desired. Once the usefulness of the product has been depleted, the material can be easily peeled from the object and disposed of or stored for later use.

For the purposes of this invention, several plastic film products have been found to be suitable for this purpose. They are marketed under the trademarks "Hi Stat" and "Transflex". These products are both made by Transilwrap, Inc. The material has a nominal thickness of approximately 0.008 inches and remains flexible throughout the temperature range for most of the anticipated usages. They are very suitable for use as the substrate or base for window displays. In addition, the material is usually placed on the inside of the window to protect it from the weather and environment wherein the interior glass surface remains substantially clean and uncontaminated to aid in maintaining the contact of the material to the glass.

To produce a final display product according to the present invention, a master display 10 is provided which consists of a large piece of transparent sheet material 11 which is larger than the intended design or display 12. The display 12 can be applied to the transparent sheet 11 by hand painting, printing, silkscreening or any other method which will be sufficient to apply a relatively dense ink, paint or coating forming the design to one side of the sheet material.

It is important to note that the sheet material, especially when used for the purpose of electrostatic adhesion to an object, must have the side which will contact the object both uncoated and uncontaminated. For this reason, it is necessary to only apply the display to the opposite side of the sheet material which will come in contact with the object. Thus, it is mandatory to apply all the inks, paints or coatings to only one side of the material which results in the new and unique process which is the subject of the present invention.

As illustrated in FIG. 1A, the display 12 is shown as a circle 14 having a specific color. Within the circle is a square 16 having a different color with an additional square composed of triangular sections 18, 20 concentrically positioned within. The triangular sections 18, 20 are represented as having entirely different colors than have been previously used. In order to emphasize and highlight the various segments of the display, the segments can be outlined with a dark line 22 such as black to provide emphasis and definition. In addition, to provide the translucency necessary for the double-sided display, it is necessary that the master display be prepared on a flexible transparent sheet similar to the sheet material actually used in the final product.

Once the master display 10 has been completed, it is then placed on a computerized digital scanner which is today quite common in the printing industry. This type of scanner usually is provided in the form of a rotary drum or cylinder having a diameter which is the same as the print rollers used on the printing press. By scanning the display as it is rotated, and using either a light or laser beam source, the display is digitally scanned through an analog to digital converter and stored in a computer memory device. This scanning process is sensitive to the individual colors that are used in the preparation of the display and therefore, the scanner is capable of performing a color separation process to separate those portions of the display having the same colors into separate images or segments.

From the digital information which is stored in the computer a number of suitable printing mats or plates are generated which are suitable for mounting on a multicolor printing press. These mats are generated so that each mat and the image that is applied to the mat corresponds to one single color used in the master display. Thus, if five colors are used, five separate mats are required and produced. It is important to note that there is no overlap in the design so that the ink that is applied during the printing process does not overlap any other portion of the design. The only contact may occur at the edges of the segments when applying the black or dark color which outlines the individual elements. For the purpose of this invention, it is important to understand that there is no underlayment of a light color, such as white, to enhance the colors or any overprint of various colors so as to produce color combinations which are so prevalent in the prior art.

In the computerized arrangement for printing, it is common to produce the individual color mats by placing the metallic or fiber mats having a photosensitive coating on one side of the rotating drum and exposing a portion of the photosensitive side with a light source which is controlled by the computer. Thus, a separate image corresponding to one color is applied to a single mat.

As illustrated in FIGS. 1B through 1F, individual mats which contain the separate elements or segments pertaining to each color are produced and made ready for the printing press. The individual mats are processed so that the photosensitive layer is developed similar to a photographic process so that the area which has been exposed to the light will be porous and allow the surface to hold the corresponding colored ink and transfer the ink to the medium upon which it will be applied. The number of mats which are produced will correspond with the total number of colors that are intended in the final display.

It is to be understood that although the computerized system for producing the mats is preferred, it is also possible to perform this function by means of the older photographic color separation process which has been used in the past. In this process, a number of photographs are taken of the master display with each individual photograph being taken through a particular color filter to form the individual color separation. With the process provided in the present invention, it is absolutely necessary that only pure colors be used in the display which do not require the overlapping of colors in order to provide the desired color blend or combination. From the individual color negative, a printing mat or plate is prepared by the photographic enlargement process. Once the mats have been developed they are mounted on the printing press the same as those which are produced by computer.

FIG. 2 shows the prior art method of printing window displays or decals. In this figure, the flexible sheet material 40 which can be either transparent or opaque is overprinted with a base coat or underlayment 42. Usually this base coat is a white or light color which makes the final display opaque and provides a background for the actual display. The edges 58, 60 of the base coat or underlayment 42 are arranged so that they do not extend to the edges of the sheet material 40.

As is found in most rotary printing processes, three or four primary colors are utilized to obtain all of the colors which are desired in the display. The four primary colors which are utilized are black, blue, yellow and red. The blue, yellow and red are primarily used in overlapping arrangement so as to provide the various combinations and shades of colors desired. Thus, the sections 44, 45 can be printed on the base coat 42 in one printing step. The sections 44, 45 have edges 52, 54 and 66, 68, respectively. For the purpose of example, this color could be blue. Thus, the edges of these sections define the edges of the blue portion of the display as applied to the base coat. In the next step of the printing process, a print section 46 is applied which has defined edges 56, 62. This color can be yellow. Thus, the edge 62 as it meets with the base coat 42 provides a definition between the yellow and the white of the base coat, while the other edge 56 overlaps the edge 54 of the section 44 and thus, this overlapping produces a color combination between the area defined by edges 54 and 56 as a green portion.

In the same fashion, section 50 which can be a red color is printed over the display in the next printing step. This section has edges 64, 70 wherein edge 64 overlaps the blue segment 45 so that a combination color of purple is produced in the overlapping section between edges 64 and 66. A portion of section 50 which only overlays the white base coat 42 appears as red in the final display. As a last printing step, section outlines 48 which are in black are printed over the entire design and provide the outline of the various portions of the design and usually overlay the exposed edges of the various color sections or segments. The primary drawback of a display of this type is that when viewed from one side, the display is quite visible and acceptable, but when viewed from the opposite side the actual display is not discernable or is barely visible through the base coat or underlayment 42. In addition, it is often necessary if the display is to be viewed externally from a store window to attach the display to the exterior surface of the window in order to be able to adequately view the finished design.

The present invention is a decided improvement over the previously described arrangement in that the flexible sheet material 80 as seen in FIG. 3 does not require any base coat or underlayment which would hinder the viewing of the display from both sides. In the present invention it is necessary to provide a unique application of the colors so that the final display is essentially a single layer coating and the individual sections of the display do not overlap. What this means, is that separate color inks which correspond to the desired color of the various sections within the finished product must be applied directly to the transparent sheet substrate or carrier material.

In this process a roll of the transparent electrostatic sheet material having sufficient width is mounted on the press and threaded through the print rollers. The individual mats for each color are mounted on the press rollers. These rollers are carefully synchronized in angular position so that the printing sections on the individual mats are aligned and synchronized to apply the ink for each specific segment precisely to each display as it is printed on the plastic carrier sheet.

As shown in FIG. 3, the ink sections such as sections 82 which can be black can be first applied to the base sheet material 80 while the next mat will apply the segment 84 which can be orange. The next step can apply segments 86 which may be a red color. The next mat can apply segments 88 which can be green. The final segments 90 could be applied having a white color. Thus, when applied to the flexible electrostatic carrier sheet 80 all of the segments are only one layer thick and are of a pure color. In this way, the desired colors are directly applied to the sheet material and the display can be equally viewed from either side.

When printing in the present process as described herein, it is absolutely necessary that the inks used for this printing process be of an extremely fast drying type so that the colors do not bleed or run from one segment to another so that the final display is dry and set as it leaves the printing press. It is possible to quicken the drying effect of the inks by including infrared or ultraviolet dryers in the printing press so that the ink can be more rapidly dried and set between each of the ink applications as the material passes through various sections of the press.

It has also been found that it may be desirable to enhance the colors of the display by rerunning the printed material through the press a second time in order to provide an additional ink layer to each of the segments of the display. Thus, the same color of ink will be applied to the previous segment in order to enhance the colors of that segment. It has been found desirable to utilize inks which are relatively dark in color in that a better presentation is obtained since a bright light passing through the transparent window and display will have a tendency to lighten or wash out the color.

This double printing can also be accomplished by providing two identical mats or printing plates for each color and applying the color twice to each display section as the sheet material makes one complete pass through the printing press.

The printing press which can be used in this process can be of any type such as the rotary direct printing or offset printing type which is common in the trade. As the printed display comes off the printing press, it is wound as a continuous roll and a backing or cover sheet is fed onto the roll to separate the layers of the carrier sheet from each other. Once the roll has been completed, the roll is removed from the printing press and the display is usually final processed by the individual displays being cut around this perimeter along with the backing or cover sheet from the roll. The finished product has a very narrow margin of flexible transparent material as well as backing sheet around the outside edge of the display. In most cases, this margin will be only ¼" to ⅜" in width. The final product can be handled, stored and transported flat or can be rolled, if desired, and placed in a tube for this purpose.

In use, the display is laid flat with the cover sheet down. If it is relatively stiff due to cold temperatures, it can be immersed in warm water to increase the flexibility of the carrier sheet. The area of the window to which the display is to be applied is washed or cleaned, if necessary. Once the surface of the window is free of contamination, dirt and oil, the display is peeled or separated from the cover sheet and applied to the desired area of the window, usually applying pressure in the middle of the display first. Through either a straight edge or the palm of the hand, the display is worked toward the outside edges from the middle so as to dispell any air that may be trapped between the sheet material and window surface. Once the display has been applied and the air bubbles have been removed, the display will stay in position until such time that it is to be removed.

In this way, an extremely clear, visible display can be provided which can be viewed from either side of the supporting window. This display is identical on either side except that the features are reversed from one side to the other. Thus, a unique product is provided which doubles the viewable display that has heretofore been available in the prior art. This type of display is extremely useful in window displays for stores and other commercial business establishments for decorations on special occasions such as Christmas, Easter and Valentine's Day. In this way, a bright sparkling display can be provided which can be removed after the season is over and stored and reused the next year or at any other time as desired.

While a new and novel display has been shown and described herein, it is to be understood that this invention is not considered to be limited to the exact form and process as disclosed and changes in the process and product may be made without departing from the spirit of this invention.

What is claimed is:

1. A reusable display which can be electrostatically adhered to a transparent support surface which allows the display to be equally viewed from either side of the surface, the display being comprised of:

(a) a thin transparent carrier sheet of electrostatic adhering material;

(b) a plurality of semi-opaque coatings applied to only one side of said transparent carrier sheet and arranged to form a design, each of said coatings being applied directly to the carrier sheet in an edge abutting, non-overlapping configuration whereby the design can be seen with equal clarity from either side of the support surface.

2. A reusable display as defined in claim 1 wherein a second layer of the same coating is applied directly to the surface of the previous corresponding coating in the non-overlapping design so as to enhance the specific, individual colors of the final display.

3. A reusable display as defined in claim 2 wherein the coatings applied to the transparent carrier sheet are semi-opaque inks which are each a different color which forms a different color segment of the final display.

4. A reusable display as defined in claim 3 wherein the inks that are used in coating the transparent carrier sheet are of the quick drying type so that the ink will not bleed or run into the adjacent segments during application.

5. A reusable display as defined in claim 1 which further includes a cover sheet applied to the opposite side of said transparent carrier sheet from the coating side to prevent the contamination and maintain the cleanliness of the surface of the transparent carrier sheet which will be applied to the transparent support surface.

6. A two-sided window display which can be applied to transparent window glass so that the display can be viewed from either side of the window and yet be removed and reused as desired, the display comprising:

(a) a transparent thin flexible carrier sheet fabricated from electrostatic adhering plastic;

(b) a plurality of colored semi-opaque, quick drying inks applied directly to the opposite side of the carrier sheet from the side which is intended to be applied to the window glass, the inks being of different colors and arranged in an abutting, non-overlapping configuration wherein the various colored segments form a desired design, each segment of the design being no more than one color in thickness in relation to the tansparent carrier sheet whereby the light passing through each segment of the design will visually enhance the appearance of the display.

7. A two-sided display as defined in claim 6 wherein the display has a cover sheet applied to the surface of the carrier sheet opposite the ink coated side whereby the side of the display which is to be adhered to the window glass will be protected from contamination so that the display can be stored and reused as desired.

* * * * *